US010466977B2

(12) United States Patent
Brabender et al.

(10) Patent No.: US 10,466,977 B2
(45) Date of Patent: Nov. 5, 2019

(54) DATA DRIVEN EMBEDDED APPLICATION BUILDING AND CONFIGURATION

(71) Applicant: Renesas Electronics America Inc., Santa Clara, CA (US)

(72) Inventors: Jon Matthew Brabender, Cary, NC (US); John L. Dallaway, Cambridge (GB); Mark Goodchild, Berkshire (GB); James Mark Deadman, Welling (GB); Brandon Cranford Hussey, Durham, NC (US); Kristine M. Jassmann, Santa Cruz, CA (US)

(73) Assignee: Renesas Electronics America Inc., Santa Clara, CA (US)

( * ) Notice: Subject to any disclaimer, the term of this patent is extended or adjusted under 35 U.S.C. 154(b) by 6 days.

(21) Appl. No.: 15/290,773

(22) Filed: Oct. 11, 2016

(65) Prior Publication Data

US 2017/0131977 A1    May 11, 2017

Related U.S. Application Data

(60) Provisional application No. 62/239,945, filed on Oct. 11, 2015.

(51) Int. Cl.
*G06F 8/34* (2018.01)
*G06F 8/41* (2018.01)
*G06F 11/36* (2006.01)

(52) U.S. Cl.
CPC .................. *G06F 8/34* (2013.01); *G06F 8/41* (2013.01); *G06F 11/3616* (2013.01); *G06F 11/3664* (2013.01)

(58) Field of Classification Search
CPC .......... G06F 8/34; G06F 8/41; G06F 11/3616; G06F 11/3664
See application file for complete search history.

(56) References Cited

U.S. PATENT DOCUMENTS 5,579,509 A * 11/1996 Furtney .................... G06F 8/71
703/27
5,613,119 A * 3/1997 France ................ G06F 9/44505
713/1

(Continued)

OTHER PUBLICATIONS

Broman, Karl, "Connecting to other packages," 2014, pp. 1-3, downloaded from The Wayback Machine Internet Archive on Sep. 29, 2017 from <url>:https://web.archive.org/web/20141010124855/http://kbroman.org/pkg_primer/pages/depends.html.*

(Continued)

*Primary Examiner* — Thuy Dao
*Assistant Examiner* — Stephen D Berman
(74) *Attorney, Agent, or Firm* — Foley & Lardner LLP (57) ABSTRACT

Provided herein are various systems, methods and architectures for enabling a microcontroller manufacturer to provide certain modification and configuration functionality to product vendors, while still maintaining the level of control needed to ensure that a product vendor does not inadvertently (or otherwise) create code that causes the microcontroller to not work properly. In one embodiment, this functionality can be performed through the steps of displaying a set of microcontroller properties that are available for configuration, receiving user information regarding a first value corresponding to a first microcontroller property, determining whether the user information results in a valid microcontroller configuration, and in response to determining that the user information results in a valid microcontroller configuration, generating compiled code for the microcontroller.

17 Claims, 8 Drawing Sheets

(56) References Cited

U.S. PATENT DOCUMENTS

| | | | |
|---|---|---|---|
| 6,308,317 B1* | 10/2001 | Wilkinson | G06F 8/443 717/139 |
| 6,816,963 B1 | 11/2004 | Krithivas et al. | |
| 6,907,522 B2 | 6/2005 | Morais et al. | |
| 7,086,014 B1* | 8/2006 | Bartz | G06F 17/5045 345/594 |
| RE40,188 E | 3/2008 | Lofstrom | |
| 7,406,674 B1* | 7/2008 | Ogami | G06F 8/34 716/117 |
| 7,653,444 B2 | 1/2010 | Tabata | |
| 7,873,948 B2* | 1/2011 | Sentovich | G06F 8/41 717/140 |
| 8,042,093 B1* | 10/2011 | Ogami | G06F 8/35 717/109 |
| 8,117,587 B1* | 2/2012 | Testardi | G06F 8/447 717/100 |
| 8,387,005 B1* | 2/2013 | Ghosh-Roy | G06F 8/34 717/109 |
| 8,983,823 B1* | 3/2015 | Koh | G06F 8/34 703/22 |
| 9,152,541 B1* | 10/2015 | Kuo | G06F 11/3672 |
| 2003/0200350 A1 | 10/2003 | Kumar et al. | 709/315 |
| 2005/0177816 A1* | 8/2005 | Kudukoli | G06F 8/34 717/105 |
| 2005/0183045 A1 | 8/2005 | Hwang et al. | |
| 2005/0210179 A1 | 9/2005 | Walmsley et al. | |
| 2006/0010446 A1 | 1/2006 | Desai et al. | |
| 2006/0020910 A1* | 1/2006 | Schlanger | G06F 8/60 717/101 |
| 2006/0033945 A1* | 2/2006 | McDonald | G06F 8/38 358/1.13 |
| 2007/0010980 A1 | 1/2007 | Tabata | |
| 2007/0055854 A1 | 3/2007 | Chang et al. | |
| 2007/0056780 A1 | 3/2007 | Jaenke et al. | 180/65.1 |
| 2007/0130530 A1* | 6/2007 | Anderson | G06F 8/34 715/762 |
| 2008/0077750 A1 | 3/2008 | Panda | |
| 2008/0079148 A1 | 4/2008 | Leung et al. | |
| 2008/0126754 A1 | 5/2008 | Chang | |
| 2010/0011198 A1 | 1/2010 | Hooker et al. | |
| 2010/0234071 A1 | 9/2010 | Shabtay et al. | |
| 2010/0293080 A1* | 11/2010 | Shah | G06F 8/34 705/34 |
| 2010/0306590 A1* | 12/2010 | Anand | G06F 11/3664 714/32 |
| 2011/0004719 A1 | 1/2011 | Fitzgerald | |
| 2012/0173931 A1 | 7/2012 | Kube et al. | |
| 2012/0269185 A1 | 10/2012 | Castleman et al. | |
| 2012/0303216 A1 | 11/2012 | Yoshimura et al. | |
| 2012/0324408 A1 | 12/2012 | Shacham et al. | 716/102 |
| 2013/0125107 A1 | 5/2013 | Bandakka et al. | |
| 2014/0280961 A1 | 9/2014 | Martinez et al. | 709/226 |
| 2014/0304439 A1 | 10/2014 | Elahi et al. | |
| 2014/0359558 A1* | 12/2014 | Chamberlain | G06F 8/34 717/105 |
| 2015/0066823 A1 | 3/2015 | Rubin et al. | |
| 2015/0074259 A1 | 3/2015 | Ansari et al. | |
| 2015/0234481 A1 | 8/2015 | Nasiri et al. | |
| 2016/0098562 A1* | 4/2016 | Hawblitzel | G06F 8/41 726/22 |
| 2016/0380817 A1 | 12/2016 | Agarwal et al. | |
| 2017/0003910 A1 | 1/2017 | Brabender et al. | |
| 2017/0060541 A1* | 3/2017 | Saleh | G06F 8/34 |
| 2017/0102924 A1 | 4/2017 | Hussey et al. | |
| 2017/0102955 A1 | 4/2017 | Hussey et al. | |
| 2017/0103192 A1 | 4/2017 | Hussey et al. | |
| 2017/0116966 A1 | 4/2017 | Brabender | |
| 2017/0131977 A1 | 5/2017 | Brabender et al. | |
| 2017/0346333 A1 | 11/2017 | De La Cropte De Chanterac et al. | |
| 2019/0163449 A1* | 5/2019 | Hein | G06F 8/34 |

OTHER PUBLICATIONS

Herbert, Olivier et al., "A method to Derive Application-Specific Embedded Processing Cores," 2000, Proceedings of the Eighth International Workshop on Hardware/Software Codesign, pp. 88-92, downloaded on Sep. 30, 2017 from the Internet at <url>:http://ieeexplore.ieee.org/document/843713/.*

S. Edwards et al., "Design of embedded systems: formal models, validation, and synthesis," 1997 [retrieved on May 24, 2019], Proceedings of the IEEE, vol. 85, Issue 3, pp. 366-390, downloaded from :https://ieeexplore.ieee.org. (Year: 1997).*

M. Sgroi et al., "Formal models for embedded system design," 2000 [retrieved on May 24, 2019], IEEE Design & Test of Computers vol. 17, Issue 2, pp. 14-27. (Year: 2000).*

Y. Zhang et al., "A software/hardware co-design methodology for embedded microprocessor core design," 1999 [retrieved on May 24, 2019], IEEE Transactions on Consumer Electronics, vol. 45, Issue 4, p. 1241-1246, downloaded from :https://ieeexplore.ieee.org. (Year: 1999).*

Bastian Schlich et al., "[mc]square: A Model Checker for Microcontroller Code," 2006 [retrieved on Jun. 17, 2019], Second International Symposium on Leveraging Applications of Formal Methods, Verification and Validation (isola 2006), pp. 466-473, downloaded from <url>:https://ieeexplore.ieee.org. (Year: 2006).*

Ashish Chauhan et al., "Reconfiguration of FPGA for Domain Specific Applications Using Embedded System Approach," 2009 [retrieved on Jun. 17, 2019], International Conference on Signal Processing Systems, pp. 438-442, downloaded from <url>:https://ieeexplore.ieee.org. (Year: 2009).*

A. Voulgaris et al., "An intelligent microcontroller-based configuration for sensor validation and error compensation," 2003 [retrieved on Jun. 17, 2019], Proceedings of the 20th IEEE Instrumentation Technology Conference, pp. 973-976, downloaded from <url>:https://ieeexplore.ieee.org. (Year: 2003).*

Hussey, Brandon Cranford et al., "Software Architecture for Embedded Systems," U.S. Appl. No. 15/290,491, filed Oct. 11, 2016; 36 pages consisting of Specification, Claims, Abstract, and Drawings.

Brabender, Jon Matthew et al., "Data Driven Embedded Application Building and Configuration," U.S. Appl. No. 15/290,773, filed Oct. 11, 2016; 39 pages consisting of Specification, Claims, Abstract, and Drawings.

* cited by examiner

| Property | Value |
|---|---|
| Common | |
| Parameter Checking | Default (BSP) |
| ICU | |
| SPI0 RXI | Priority 4 |
| SPI0 TXI | Priority 4 |
| SPI0 ERI | Priority 4 |
| SPI0 IDLE | Priority 4 |
| Module | |
| Name | g_spi0 |
| Channel | 0 |
| Operating Mode | Master |
| Clock Phase | Data sampling on even edge, data variation on odd edge |
| Clock Polarity | High when idle |
| Mode Fault Error | Disable |
| Bit Order | MSB First |
| Bitrate | 40000000 |
| Callback | NULL |
| SPI Mode | Clock Synchronous operation |
| SPI Communication Mode | Full Duplex |
| Slave Select Polarity(SSL0) | Active Low |
| Slave Select Polarity(SSL1) | Active Low |
| Slave Select Polarity(SSL2) | Active Low |
| Slave Select Polarity(SSL3) | Active Low |
| Select Loopback1 | Normal |
| Select Loopback2 | Normal |
| Enable MOSI Idle | Disable |
| MOSI Idle State | MOSI Low |
| Enable Parity | Disable |
| Parity Mode | Parity Even |
| Select SSL(Slave Select) | SSL0 |
| Select SSL Level After Transfer | SSL Level Do Not Keep |
| Clock Delay Enable | Clock Delay Disable |
| Clock Delay Count | Clock Delay 1 RSPCK |
| SSL Negation Delay Enable | Negation Delay Disable |
| Negation Delay Count | Negation Delay 1 RSPCK |
| Next Access Delay Enable | Next Access Delay Disable |
| Next Access Delay Count | Next Access Delay 1 RSPCK |

DATA DRIVEN EMBEDDED APPLICATION BUILDING AND CONFIGURATION

RELATED APPLICATIONS

This application claims the domestic benefit under Title 35 of the United States Code § 119(e) of U.S. Provisional Patent Application Ser. No. 62/239,945 entitled "Microcontroller Development Platform," filed Oct. 11, 2015 which is hereby incorporated by reference in its entirety and for all purposes as if completely and fully set forth herein.

BACKGROUND OF THE INVENTION

In the embedded product domain, the embedded software applications provided with microcontrollers are often not production quality. That is, the software provided with the microcontroller is often insufficient for the specific needs of the product into which that microcontroller is to be embedded. As a result, the product vendor who purchased the microcontroller may need to modify the microcontroller's embedded software application before the embedded software application can be adequately used in the vendor's product. Such a product vendor may face numerous challenges, including a lack of familiarity with the underlying code (including variable names, function calls, dependencies, and so forth) used to code the embedded software application. Moreover, any resulting modifications must still effectively and carefully use the relatively-limited amount of memory available to a microcontroller and an embedded software application (particularly as compared to the much-greater amount of memory that is typically available to microprocessors as used in devices such as general purpose computers). Therefore, embedded software applications must use the memory judiciously and efficiently. Moreover, any customizations or modifications must also comply with various other constraints that are specific to a given microcontroller model. Accordingly, there exists a need to provide product vendors with an interface and the related functionally that enables the product vendor to modify the microcontroller's embedded software application(s) with sufficient detail to meet the product's needs, but without having to deal with the memory issues and other constraints associated with typical object oriented programming languages or the complexities of using various software stacks within an embedded software application.

SUMMARY OF THE INVENTION

The systems and methods provided herein enable a microcontroller manufacturer to provide certain modification functionality to product vendors, while still maintaining the level of control needed to ensure that a product vendor does not inadvertently (or otherwise) create code that causes the microcontroller to not work properly.

BRIEF DESCRIPTION OF THE DRAWINGS

The present invention may be better understood in its numerous objects, features, and advantages made apparent to those skilled in the art by referencing the accompanying drawings.

DETAILED DESCRIPTION

Microcontrollers were originally programmed only in assembly language, but various high-level programming languages are now also in common use to target microcontrollers. These languages are either designed specifically for the purpose, or versions of general purpose languages such as the C programming language. Compilers for general purpose languages typically have some restrictions as well as enhancements to better support the unique characteristics of microcontrollers. Some microcontrollers have environments to aid developing certain types of applications. Microcontroller vendors often make hardware development platforms freely available to make it easier to adopt their hardware. These platforms include software tools for developing and/or debugging applications.

In the past engineering teams used to spend valuable development time writing software ranging from low-level peripheral drivers to complex communication and specialty stacks for microcontrollers. This resulted in months of engineering resources spent integrating, testing, and maintaining software that still did not differentiate the vendor's product in the market.

Disclosed herein are systems and methods that allow product vendors to interact with microcontroller platforms at a much higher level and much more efficiently than would have been possibly previously. The disclosure provided herein describes a software pack (or "SP," and which is sometimes referred to as a Synergy SP, or "SSP") in greater detail. Included in this disclosure are apparatuses and methods for improving developing, customizing, debugging, and so forth, of microcontroller applications.

Microcontrollers are often embedded in other machinery or products, and include embedded software application(s) that are specifically designed to control or otherwise interface with the specific product in which the microcontroller is embedded. As will be discussed in more detail below, embedded software applications can be "flashed," uploaded, or otherwise stored (or modified or changed) in a memory on the microcontroller, after the microcontroller has been manufactured and sold. Thus, as can be seen from the disclosure provided herein, microcontrollers stand in contrast to the microprocessors used in general purpose computers or other general purpose applications.

By reducing the size and cost through the use of microcontrollers, particularly as compared to a design that uses a separate microprocessor, memory, and input/output devices, microcontrollers make it economical to digitally control many devices and processes. However, despite their many advantages particularly in the embedded space, microcontrollers typically have much less available memory than microprocessors because components such as the memory and CPU are built directly onto the chip. Moreover, the memory embedded in a microcontroller cannot easily be "swapped out" or "added to," as is the case with the external memory devices that are typically connected to microprocessors. As such, making optimal use of a microcontroller's very limited memory is of the utmost importance when programming embedded software applications for use with microcontrollers. Such constraints are much less significant when dealing with programs that are designed for use with microprocessors.

Example Microcontroller Architecture

Figure 1:
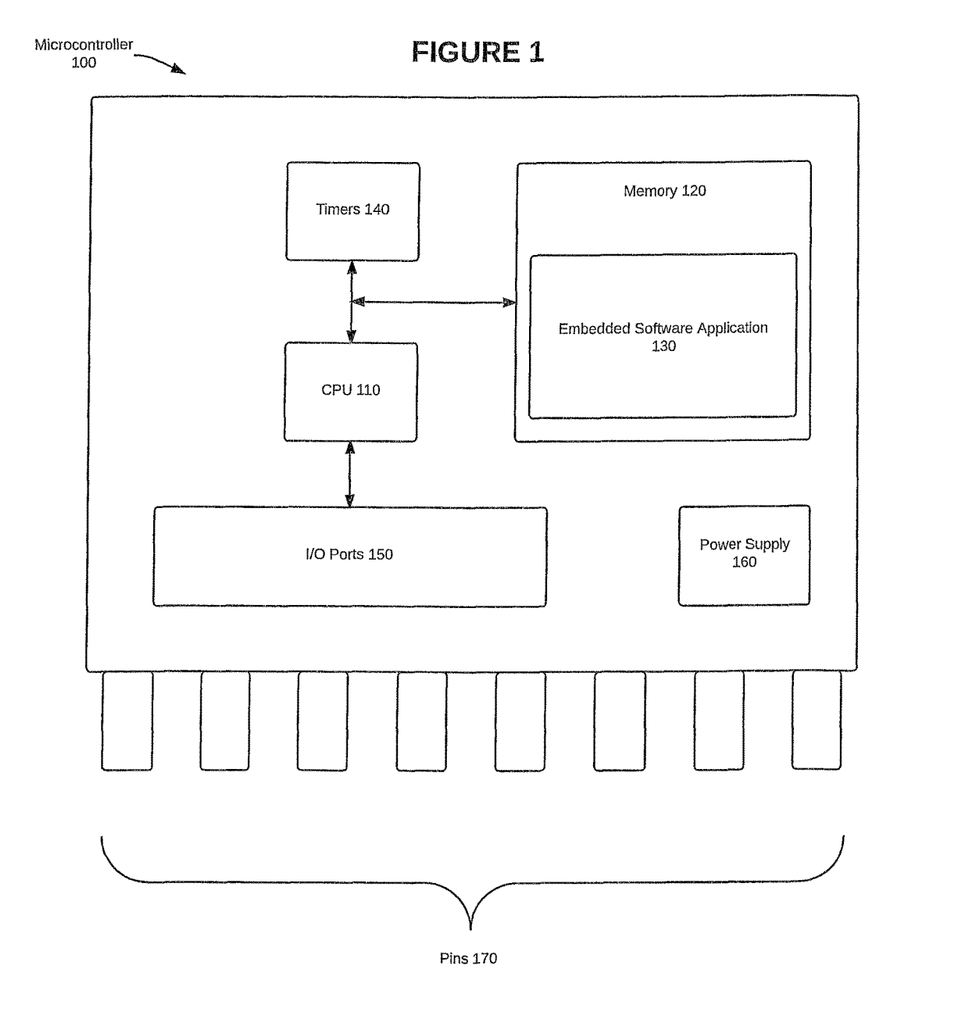
FIG. 1 is a block diagram illustrating certain components of an example microcontroller, according to one embodiment.

FIG. 1 is a block diagram depicting a microcontroller 100, according to one embodiment of this invention. As shown in FIG. 1, microcontroller 100 includes an embedded CPU 110, a memory 120 that includes an embedded software application 130, timers 140, I/O ports 150, a power supply 160, and a set of pins 170, each of which will be discussed in more detail below. Moreover, although not expressly depicted in FIG. 1 but as would be understood to one skilled in the art, microcontroller 100 can include numerous other components and functionality, including at least additional pins and various other components that contribute to the functionality of microcontroller 100. Additionally, microcontroller 100 can include an operating system, such as, e.g., a real-time operating system, or "RTOS." In one embodiment, the RTOS (or other operating system) is stored in memory 120, along with embedded software application 130. In certain embodiments, memory 120 can store more than one embedded software application, as well as other potential software, data, and information.

A microcontroller (sometimes abbreviated μC, uC or MCU), such as microcontroller 100, is a small computer on a single integrated circuit, or "chip." Unlike microprocessors, which are typically designed to interface with memories and other components that are external to the microprocessor, microcontrollers typically contain multiple components on a single chip. As such, microcontrollers typically contain at least a central processing unit (CPU), such as CPU 110; one or more non-transient memories, such as memory 120; timing functionality, such as can be provided by timers 140; programmable input/output peripherals, such as I/O ports 150; a power supply, such as power supply 160; and multiple pins, such as pins 170, among other components that are all provided on a single chip. Thus microcontrollers stand in stark contrast to microprocessors, as the aforementioned components are typically externally connected to microprocessors, rather than being included on a single chip, as is the case with microcontrollers.

As a result of the architectural differences between microprocessors and microcontrollers, microcontrollers are often more suitable for use in dedicated applications, whereas microprocessors are often more suitable for use in larger, general-purpose computers. Thus, in one sense, the use of a microcontroller is highly advantageous with respect to dedicated applications and the "embedded space," among other uses. For instance, microcontrollers can be used in automatically controlled products and devices, such as automobile engine control systems, implantable medical devices, remote controls, office machines, appliances, power tools, toys and other embedded systems. In another sense, however, microcontrollers face a unique set of challenges, such as those discussed herein, and those challenges are particularly with respect to coding and modifying embedded software applications.

In a typical microcontroller, such as microcontroller 100, memory 120 can include program memory, RAM, ROM, and/or flash memory, and is typically embedded directly on the microcontroller. Memory is typically significantly more limited on a microcontroller than is the case when dealing with microprocessors. For instance, microcontroller memory typically ranges from 128 kilobytes (KBs) of ROM (or flash memory) to 4 megabytes (MBs) of ROM (or flash memory), and perhaps more or less in certain situations. The ROM is not typically an issue, although the use and allocation of RAM can create significant programming constraints and runtime problems if not properly handled during programming. In fact, some microcontrollers may have as little as 16 kilobytes (KBs) of RAM, which can be fully allocated very quickly, particularly when done so dynamically.

The aforementioned constraints become especially problematic when an embedded software application uses the heap, such as when an object oriented programming ("OOP") language is used to code an embedded software application, which is due to the heap's memory being located in the RAM. The heap is used to dynamically allocate memory, which provides more programming flexibility than a static memory array. For instance, instead of creating and using a 1 KB static array, a program (such as, e.g., an embedded software application) may instead create and use a 2 KB memory heap that can be allocated dynamically. If an embedded software application is configured to always use a buffer (e.g., a communications buffer) of a certain size, then the application can allocate the buffer for that purpose and have certainty in this regard. But if the embedded software application is not configured to always use that buffer, then allocating a predetermined and specific amount of RAM (e.g., 1 KB out of 16 KBs of RAM that may be available) can be a big concession. On a larger computer with more memory, such as one controlled by a microprocessor, such a concession regarding allocating memory in this manner (e.g., dynamically) is usually not a problem. But when a program (such as embedded software application 130) is configured to operate on a microcontroller, which typically has relatively limited amounts of memory (e.g., often 16 KBs of RAM or less), allocating memory in this manner can be burdensome. Moreover, depending on the specific field in which the product is being used, running out of memory can create a very big problem, such as, e.g., in the case of a product being used in the medical field.

Moreover, since the memory is embedded directly on the microcontroller, the memory cannot be easily expanded, increased, or "swapped out," as is the case with the memory used by most microprocessors (such as, e.g., in a general purpose desktop or laptop computer). Because memory is limited, embedded software applications, such as embedded software application 130, should preferably allocate memory statically to avoid any chance of running out of memory (such as, e.g., at run time). If an embedded software program instead uses the heap and/or allocates memory at run time, then there is a very real chance that the system will run out of memory (such as, e.g., at run time or during the operation of the product into which the embedded software application is embedded).

Moreover, microcontroller embedded software applications must typically fit in the available on-chip program memory, since it would be costly to provide a system with external, expandable, memory. Compilers and assemblers are used to convert high-level language and assembler language codes into a compact machine code for storage in the microcontroller's memory. Depending on the device, the program memory may be permanent, read-only memory that can only be programmed at the factory, or program memory that may be field-alterable flash or erasable read-only memory. The use of field-programmable devices on a microcontroller may allow field update of the firmware or permit late factory revisions to products that have been assembled but not yet shipped. Programmable memory also reduces the lead time required for deployment of a new product. A customizable microcontroller incorporates a block of digital logic that can be personalized in order to provide additional processing capability, peripherals and interfaces that are adapted to the requirements of the application.

Thus, coding and modifying an embedded software application while still optimizing the allocation and use of a microcontroller's memory is quite challenging and subject to errors that can be significant, costly, and even potentially deadly (such as when dealing with devices in the field). These problems only become exacerbated when the embedded software application is being modified by a product vendor who did not create the microcontroller and who also did not code the original embedded software application. Moreover, product vendors face additional challenges when modifying an embedded software application, since such embedded software applications often contain multiple software modules, which were often coded by other (and perhaps multiple) companies. The disparate manner in which embedded software applications are often created can very often cause a product vendor to be unfamiliar with variable names and usage, function calls, parameters, and so forth, within the various modules and overall embedded software application. The constraints and challenges discussed herein also make it harder for a programmer (such as, e.g., a product vendor who did not manufacture the original microcontroller) to get software certified according to various standards.

The aforementioned factors (and other differences from typical systems that use microprocessors) become especially important when selecting the language used to code an embedded software application, such as embedded software application 130. Computer software libraries, such as can be found in many programming languages, such as, e.g., C++ and Java, are less than ideal (although they can be used) in the embedded space. For instance, if a program only needs a small portion of a library, object oriented programming ("OOP") languages often require a program to import an entire library to have access to the needed portion of code. When dealing with software applications designed to run on standard computers (e.g., laptop or desktop computers), importing an entire library for the sake of only one (or some) command(s) is not a problem because such computers typically have an abundance of available memory. However, when memory is limited, as is the case in most products containing an embedded microcontroller, such functionality is not a viable option.

Moreover, while OOP languages offer many benefits to a programmer and are often easier to use for coding purposes, such languages also tend to produce executable code that consumes a lot of memory. At the other end of the spectrum, assembly language allows for more control over memory issues but is much harder for a programmer to learn and use. A language such as C provides a good balance between these various considerations, and as an added benefit, can also be compatible with C++, if needed. Thus, in one embodiment, the C programming language is a good choice for coding embedded software applications, such as embedded software application 130.

However, even the C programming language provides a certain set of challenges, especially to product vendors attempting to modify an embedded software application that was originally coded by other programmers working for one or more distinct companies. For instance, the C programming language is not always easy for less-experienced programmers to use, especially when they are attempting to modify an embedded software application created by someone else, and even more so when they are attempting to modify that embedded software application without knowledge of the underlying code used to create the original embedded software application. As such, and as will be discussed in more detail below, the need exists for a product that provides product vendors with the flexibility needed to customize embedded software applications to work with their specific products, while also taking into account the memory constraints, coding complexities, and other issues discussed herein.

In addition to the aforementioned features and constraints, microcontroller 100 also includes timer 140, which can provide timing functionality for microcontroller 100. Although represented somewhat generically in this Figure, in practice timer 140 can be a device such as, e.g., a timer, event counter, and/or clock generator. Microcontroller 100 also includes I/O ports 150, which provide input-output functionality such as, e.g., discrete input-output bits and/or serial ports. Microcontroller 100 also includes power supply 160, and a set of pins 170. In practice, microcontroller 100 can include more or less than eight pins, and can (and typically does) include pins on other edges or sides of the chip. Moreover, microcontroller 100 can also include numerous other components that are not expressly depicted in FIG. 1.

Some microcontrollers may operate at clock rate frequencies as low as 4 kHz, which provides for low power consumption. Microcontrollers will generally have the ability to retain functionality while waiting for an event such as a button press or other interrupt. However, power consumption while a microcontroller is in a "sleep" or wait mode (such as, e.g., when CPU clock and most peripherals are off) may be very small, making many of them well suited for long-lasting battery applications. Other microcontrollers may serve performance-critical roles, where they may need to act more like a digital signal processor (DSP), with higher clock speeds and power consumption.

Microcontrollers must provide real time (predictable, though not necessarily fast) response to events in the embedded system they are controlling. When certain events occur, an interrupt system can signal the CPU to suspend processing the current instruction sequence and to begin an interrupt service routine (ISR, or "interrupt handler"). The ISR will perform any processing required based on the source of the interrupt, before returning to the original instruction sequence. Possible interrupt sources are device dependent, and often include events such as an internal timer overflow, completing an analog to digital conversion, a logic level change on an input such as from a button being pressed, and data received on a communication link. Where power consumption is important in battery operated devices, interrupts may also wake a microcontroller from a low power sleep state where the CPU is halted until required to perform a specific action, such as can be caused by a peripheral event.

Expanded View of Embedded Software Application Architecture

Figure 2:
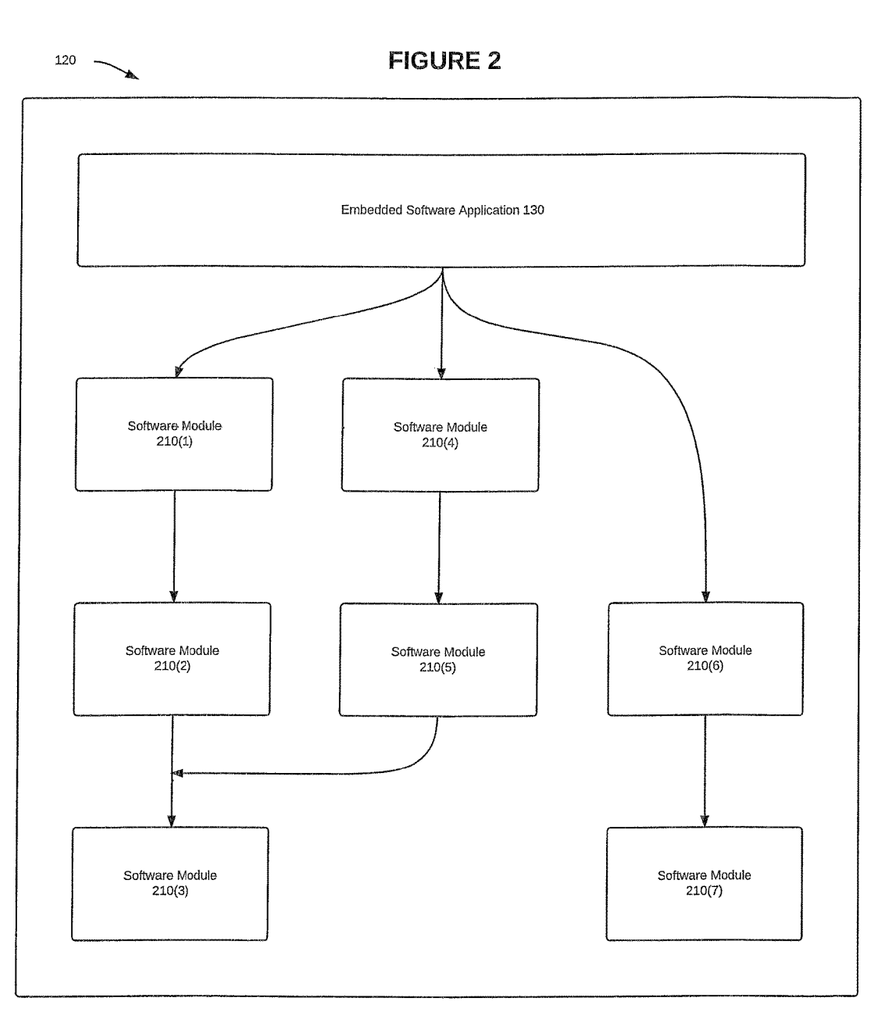
FIG. 2 is a block diagram illustrating an example embedded software application including multiple SSP software modules aligned in multiple stacks and multiple layers, according to one embodiment.

FIG. 2 is a block diagram depicting certain aspects of memory 120 of microcontroller 100, including embedded software application 130, and software modules 210(1)-(n). In accordance with one embodiment of this invention, software modules 210 are arranged in three vertical stacks, and cover three horizontal layers. Although this example architecture is used to facilitate the discussion provided in this disclosure, in practice many other combinations and amounts of software layers, stacks, and layers can be used.

Embedded software application 130 can be any embedded software application ("embedded application"). As an example, embedded software application 130 can be software designed to control or provide other functionality for a specific product, and which can be embedded in that product. For instance, microcontrollers can be used in automatically controlled products and devices, such as automobile engine control systems, implantable medical devices, remote controls, office machines, appliances, power tools, toys and other embedded systems.

Embedded software applications differ from traditional software programs and software operating systems at least because embedded applications face significant memory constraints. For example, due largely to the practical constraints of the product in which the embedded application is embedded, as well as cost issues associated with many forms of memory, an embedded application may only have access to 2 MB of memory. Such memory constraints affect numerous aspects of an embedded application, including how the embedded application manages run-time memory (such as, e.g., the heap) as well as how the embedded application itself is coded. Due to the overall memory constraints of embedded devices, there exists a great need to only include the specific functionality that is absolutely necessary for the embedded application to function properly, without necessarily including entire software libraries such as is often done, e.g., when using object oriented programming ("OOP") languages (such as Java and C++) to code software programs. At the same time, this need for precise and limited memory allocation must be balanced against the need of embedded device manufacturers (who generally do not manufacture the microcontrollers themselves) to modify the embedded applications that control a given embedded device, while still being subject to the constraints above, among other such constraints.

Moreover, many embedded software applications include multiple software stacks, such as is depicted in FIG. 2. For instance, software modules 210(1)-(3) constitute one stack, software modules 210(4)-(5) constitute a second stack, and software modules 210(6)-(7) constitute a third stack. As is also shown in FIG. 2, each of those software stacks includes multiple layers of software modules, such as software modules 210(1) and 210(4) in layer 2, software modules 210(2), 210(5), and 210(6) in layer 1, and software modules 210(3) and 210(7) in layer 0. Although FIG. 2 depicts one stack that includes three software modules, and two stacks that each include two software modules, in practice a stack may include less than two (i.e., one) software modules or more than three software modules. Moreover, a given embedded software application may include more or less than three stacks of software modules. The relationships between these software modules will be discussed in more detail below. For the time being, it should suffice to say that certain dependencies exist among software modules within a given stack, but one stack of software modules is not necessarily dependent upon information generated, produced, or "returned" by software modules in another stack.

In practice, software modules such as these are often developed by different companies, with different rules, variables, function calls, and so forth. Even where all of the software modules are developed by the same company, the company which initially developed and coded those software modules is most likely distinct from the product vendor company that must modify one or more of those software modules in order to adequately use the microcontroller in the vendor company's product(s). Thus, the complexities of these software modules, as well as the relationships between these software modules, can make modifying one or more of these software modules very challenging, particularly where the person or company performing the coding modification is different from the person or company who originally coded the software module(s) and/or embedded software application.

Prior to the creation of the systems and methods disclosed herein, product vendor faced a difficult task when attempting to modify or customize embedded software applications and their incumbent software modules for use in a specific dedicated product, examples of which are provided elsewhere in this disclosure. For instance, before any such customization was even possible, a product vendor (who did not manufacture the microcontroller or code the original embedded software application) faced a challenging task just in attempting to figure out how all of the software stacks and modules relate to each other, let alone figuring out how to modifying the various code sources without "breaking" the overall embedded software application. Thus, any such modifications were costly, time consuming, and inherently risky, since the modification could easily "break" the embedded software application and thereby prevent the proper functioning of the microcontroller and/or the vendor's product into which the microcontroller is embedded. Moreover, different microcontrollers are configured differently with respect to various aspects of their functionality, such as, e.g., memory, processor speed, and so forth. These variables and potential configurations further add to the complexity faced by product vendors in modifying an embedded software application to work for a given microcontroller within a product vendor's specific product(s).

Software Module Stack and Relationships

Figure 3:
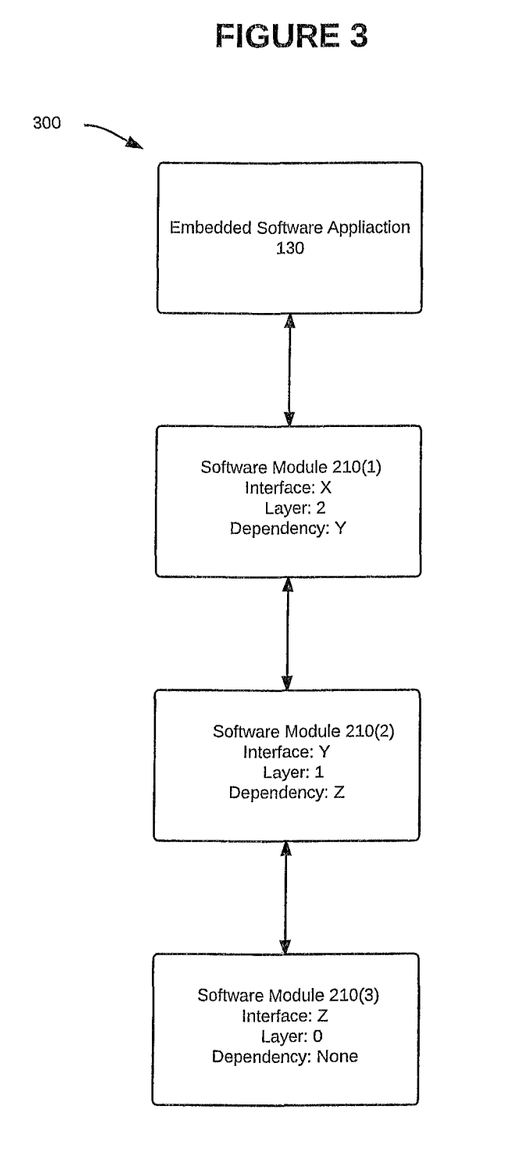
FIG. 3 is a block diagram illustrating an example set of relationships between three software modules aligned in a single, three-layer stack, according to one embodiment.

FIG. 3 is a block diagram illustrating an example set of relationships between three software modules aligned in a single, three-layer stack 300, according to one embodiment. More specifically, FIG. 3 depicts the leftmost "stack" of FIG. 2 as one example of a stack of software modules, including software modules 210(1)-(3), which are logically and schematically connected to embedded software application 130. In practice, these connections can represent any method of transferring information between connected software modules, and/or between an embedded software application and any module directly connected to it.

Every software module will provide some functionality. In addition to supplying functionality (as output), a software module may also have a input requirement, or dependency, that must be met in order to work. As can be seen from the additional detail provided by FIG. 3, each software module 210 includes an interface and, at least potentially, has a dependency based on information needed from another software module. The relationships between these interfaces and dependencies enable the software modules to be "stacked" by matching the information that one software module provides with the information that another software module requires in order to function properly.

An interface defines a set of functionality that must be supported by any module that adheres to that interface. In a sense, an interface provides an agreed upon "contract" between two software modules. Interfaces can be built from various data structures, such as, e.g., "typedefs," enumerations, and macros, as some examples. In one embodiment, the functionality defined by an interface can take the form of an Application Program Interface ("API").

Interfaces can vary in size, complexity, and functional specificity. Some interfaces can have narrow use cases where the configurability of the interface is clearly defined. Other interfaces will support many different types of use cases. Where many use cases are supported, the level of configurability specified by the interface may be limited to allow for maximum reuse. Conversely, the interface extension of a software module implementing the interface may be larger than the original interface itself.

Interfaces allow a user (such as, e.g., a product vendor, or the employees or contractors thereof) to modify software modules and swap modules in and out of a software stack without having to access and/or modify the underlying code itself. This structure and functionality enables users to swap modules in and out to suit their needs, but without any risk of introducing errors into (or otherwise compromising the integrity of) the underlying code.

Software modules that have an interface requirement must adhere to that interface. At least potentially, each module can also include a dependency, although some software modules may not be dependent on information received from any other module. If a software module has a dependency requirement, that dependency requirement will be for information received from another interface pursuant to the definition of that interface. For example, software module 210(1) is dependent on information received from interface Y, which is the interface of software module 210(2). Software module 210(2) is, in turn, dependent on information received from interface Z, which is the interface of software module 210(3). Software module 210(3), which is at layer 0 of the stack, contains interface Z and thus can provide information to software module 210(2) according to the constraints and parameters of interface Z. However, software module 210(3) is not itself dependent on information received from any other software module in this stack. Moreover, embedded software application 120, which is shown at the "top" of this stack, is configured to receive and use information from software module 210(1), as defined by interface X.

Importantly, software modules that do not "match" cannot be stacked directly on top of each other. For instance, using FIG. 3 as an example, software module 210(1) cannot be stacked directly on top of software module 210(3) without having software module 210(2) (or another software module that has the same interface and dependency as those of software module 210(2)) in between them. Stacking software module 210(1) directly on top of software module 210(3) would not work because software module 210(3) provides information according to interface Z, which would not be properly understood by software module 210(1), which has a dependency that requires information provided by interface Y. Moreover, stacking software module 210(1) directly on top of software module 210(3) would cause a further problem in that software module 210(1) is dependent on information provided by interface Y, which software module 210(3) does not and cannot provide in this example embodiment. Thus, if software module 210(1) was stacked directly on top of software module 210(3), software module 210(1) would receive information that it is not programmed to handle (from interface Z), but would not receive the information that is required for software module 210(1) to function properly (from interface Y).

As will be discussed in more detail below, the use of predefined interfaces enables software modules and even entire stacks of software modules to be swapped in and out by vendors. Microcontroller manufacturers often have a wide range of products that they offer, ranging from lower end products to higher end products. The different products have different features. If, for example, a microcontroller manufacturer may release a demonstration product using a high end microcontroller, but a vendor may want to use a lower end microcontroller in their product instead. As a result, the product vendor may have to modify one or more software modules in order to use the lower end microcontroller in its product. As one example, if a demonstration product is designed to work on a higher end microcontroller, certain application functionality may be incompatible with a vendor's product that uses a lower end microcontroller. As will be discussed in additional detail with respect to FIG. 5, below, the systems and methods described herein enable vendors to swap out incompatible software stacks and replace them with software stacks or modules that are compatible with their system and products while avoiding the numerous problems described throughout this disclosure (e.g., compatibility, dependencies, memory constraints, the general operability and reliability of the resulting code, the need for certain code to be certified, and so forth).

Example of Module Instances

Moreover, there can be differences between software modules that adhere to the same interface. For example, a given software module may offer more functionality than is exposed in an existing interface. In such a situation, a module-specific interface extension can be used. These extensions allow software modules to expose further configuration options without breaking the adherence requirements of an interface.

Software modules can also support multiple uses simultaneously. Each independent use of a software module is referred to herein as a module instance. A module that implements an interface is called an instance. Instances can be swapped out to meet the requirements of a given product's design. Moreover, interfaces can allow for the use of instance-specific interface extensions, which can be used to provide specialized features that are not exposed in an interface itself. Interface extensions allow for extra features to be enabled in an instance.

For instance, a product vendor may desire to control the "pin out" of a microcontroller. Pin out refers to the pins protruding from a chip, such as, e.g., a microcontroller. Pins enable a microcontroller to communicate with other components of a device in order to make various actions occur. Different microcontroller designs can have a variable number of pins (e.g., from 34 to 244 pins) that enable a microcontroller to interface and communicate with other products. The function of a given pin is often not statically assigned, but rather each pin may have a multiple available options. However, vendors often want to choose a specific function for each pin and statically assign that function to that pin prior to the production of the vendor's larger product. The systems and methods provided herein enable a user to make such a determination and assignment to the pins (e.g., to set the "pin out") in order to meet their specific needs. At the same time, providing this functionality to the vendors allows the vendors the flexibility that they need without requiring the microcontroller manufactures to provide an unnecessarily-high number of pins, which would unnecessarily increase the cost of the microcontroller (and thus increase the cost of the vendor's products as well). The architecture, systems and methods disclosed herein enable a software program (such as, e.g., a Synergy Software Pack) to support the functionality that a product vendor wants a chip (e.g., microcontroller) to perform.

Moreover, in order to support a varying number of module interfaces at runtime, the resources required for a module instance can be specified at runtime. This can be supported by configuring every module to have a control structure. The control structure holds resources required for a module instance. In one embodiment, a pointer to a control structure can be the first parameter in every interface function that is based on a module instance. An example of a function that is not based on a module instance is a function that returns the version of a module.

Figure 4:
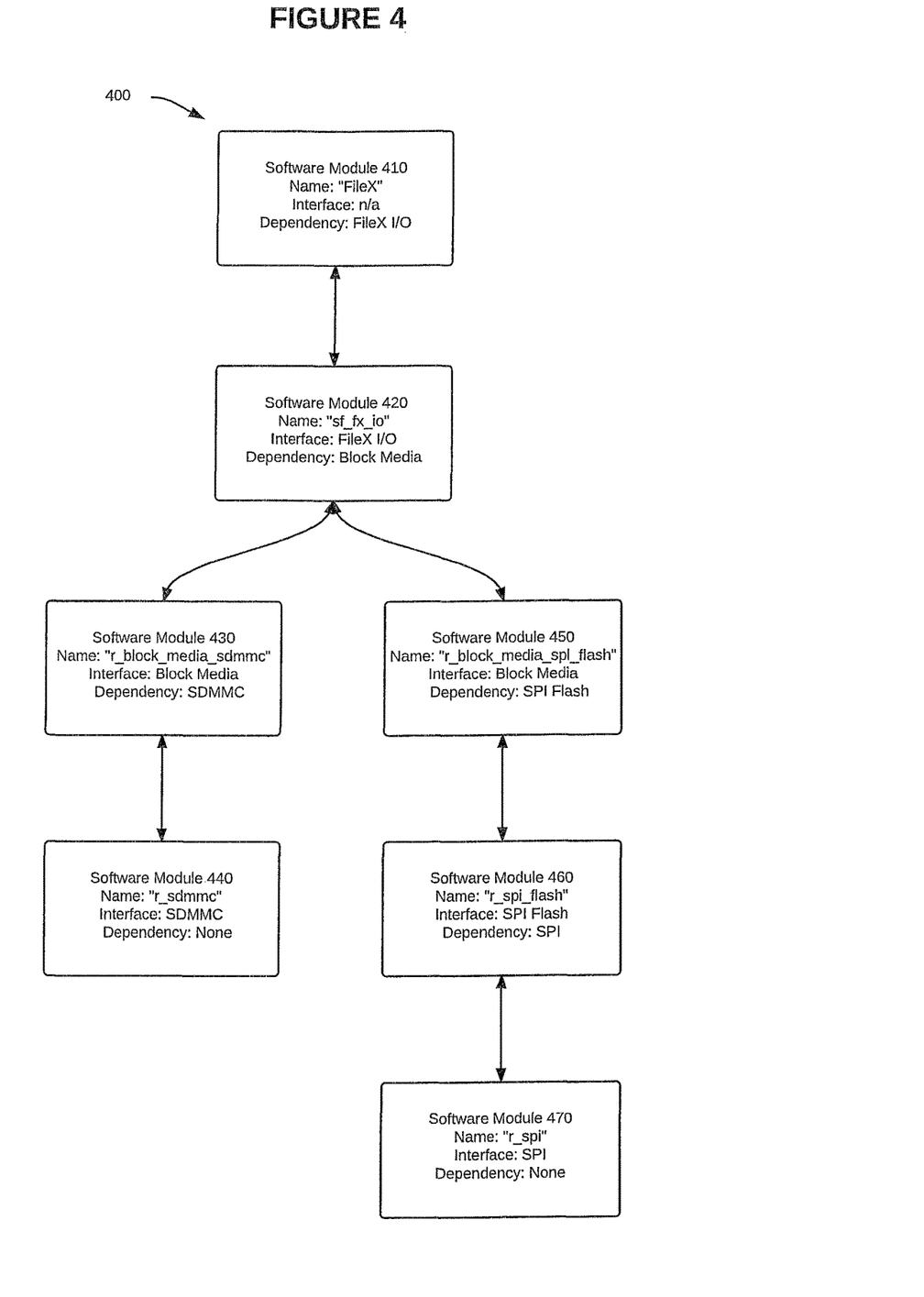
FIG. 4 is block diagram illustrating an example set of relationships between multiple modules aligned in a single stack with two alternate branches, according to one embodiment.

As will become clear from the discussion of FIG. 4, below, a given interface can be implemented on a variety of module instances. For instance, FIG. 4 shows the "Block Media" interface being implemented on both the "r_block_media_sdmmc" module as well as on the "r_block_media_spi_flash" module. Both of these modules produce output according to the same interface, but as will be discussed in more detail below, both of these modules also have many differences, including the "dependency" that each module accepts as input.

The systems, method, and architecture described herein allows for product vendors (and other programmers) to expand upon the default interfaces provided with the original embedded software application provided by the microcontroller's manufacturer. At the same time, requiring software modules to adhere to an interface ensures that new software modules can be created for the same interface after the original embedded software application was coded, and even after the embedded software application has been modified. That is, multiple rounds of modification are possible. Such expandability of the interfaces is also possible inside of an interface. That is, data structures that are used in any case where a specific feature or features is needed can be expanded to meet future needs.

To add more specificity to the above description, by way of example, consider a stack such as the one shown in FIG. 4. FIG. 4 is a block diagram illustrating an example set of relationships between multiple software modules. More specifically, FIG. 4 depicts a set of software modules that constitute a portion of a file system that can be used in conjunction with a real-time operating system of a microcontroller. In the specific embodiment depicted in FIG. 4, the file system is the FileX® file system created by Express Logic, Inc.®, which has its United States headquarters in San Diego, Calif.

FIG. 4 includes a stack 400 that includes seven software modules, numbered 410 through 470. These software modules are specific embodiments of software modules 210, and thus share many definitional characteristics with software modules 210. As can be seen in FIG. 4, software module 410 is named "FileX," and represents a portion of the aforementioned FileX® file system. Software module 410 does not include an interface, since there is no other module that is dependent upon information from software module 410 in this embodiment. Software module 410 does, however, have a dependency for information received from the "FileX I/O" interface, which can be found in software module 420.

As can be seen in FIG. 4, software module 420 is named "sf_fx_io," which in this embodiment is indicative of the role and functionality of software module 420. As one of skill in the art would recognize, a software module's name does not necessarily have to correspond to its function, although naming software modules in this manner is generally considered to be a good programming practice. Software module 420 provides information to software module 410 via the "FileX I/O" interface, and software module 420 is also dependent upon information received from other software modules via the "Block Media" interface.

In the embodiment shown in FIG. 4, software module 430 and software module 450 both provide information to software module 420 via the "Block Media" interface. However, software module 430 and software module 450 each receive information from different interfaces. As its name and dependency both indicate, software module 430 receives information via the SDMMC interface. As one of skill in the art would recognize, the SDMMC interface allows a microcontroller to communicate (via software modules and/or an embedded software application) with various external memory devices that use the SDMMC interface, such as, e.g., multimedia cards, memory cards, SDIO devices, and flash memory devices. In the embodiment depicted in FIG. 4, software module 440 provides information to software module 430 via the SDMMC interface. In one embodiment, software module 440 may be integrated within an external memory device, such as those discussed herein. In other embodiments, other configurations are possible.

In contrast to software module 430, software module 450 receives information via the Serial Peripheral Interface ("SPI") Flash interface. The SPI Flash interface is provided by software module 460, which itself receives information from software module 470 via the SPI interface. As one of skill in the art would recognize, the SPI interface allows a microcontroller to communicate (via software modules and/or an embedded software application) with various external memory devices that use the SPI interface. Although not necessarily so limited, SPI is often used to connect external devices, such as, e.g., cameras, printers, and scanners. In the embodiment depicted in FIG. 4, software module 470 provides information to software module 460 via the SPI interface. In one embodiment, software module 470 may be integrated within an external memory device, such as those discussed herein. In other embodiments, other configurations are possible.

Thus, the architecture of FIG. 4 enables software module 420 to receive information from either a device that supports the SDMMC interface (via software modules 430 and 440), or from a device that supports the SPI interface (via software modules 450-470). As was alluded to above, the decision as to whether software module 420 receives information that began at an SDMCC-enabled device or at an SPI-enabled device is a decision that can be made at runtime, depending on which sort of device is connected to a product that includes the necessary software modules to support this functionality. As was indicated elsewhere, the architecture of FIG. 4 is provided as an example of the type of functionality that can be provided by the systems, methods and architecture disclosed herein, but is not in any way intended to limit the use of this disclosure to this one specific example, which again is provided primarily for the purposes of explanation and discussion.

Figure 5:
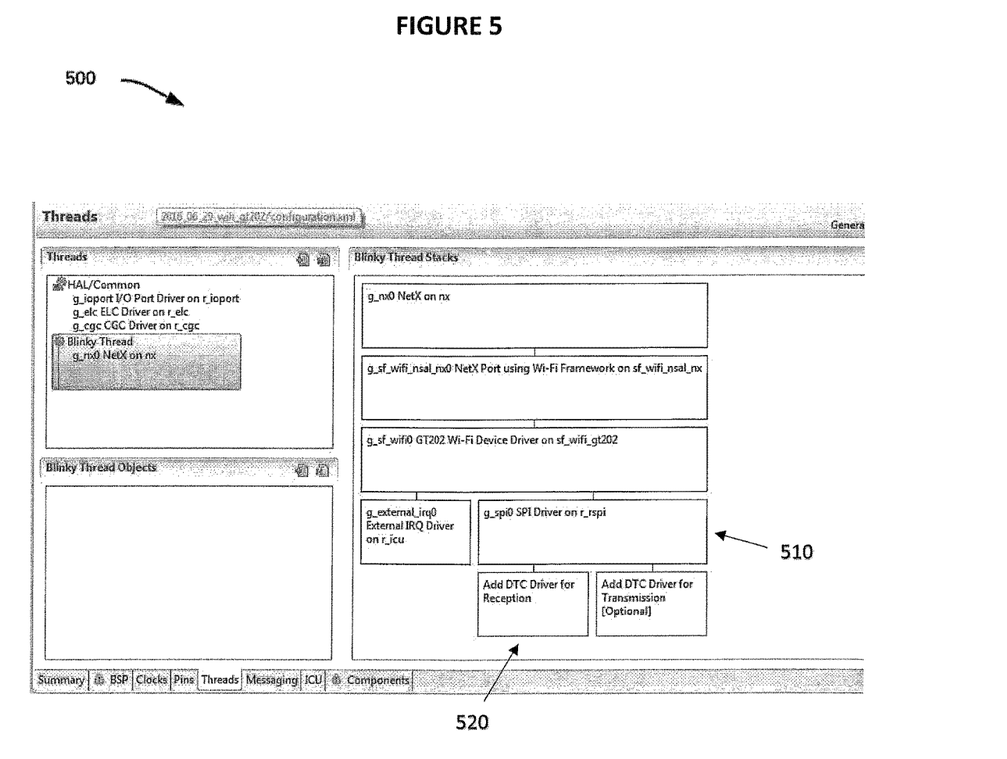
FIG. 5 is a screenshot of an example graphical user interface for picking a software module to customize, according to one embodiment.
Figure 6:
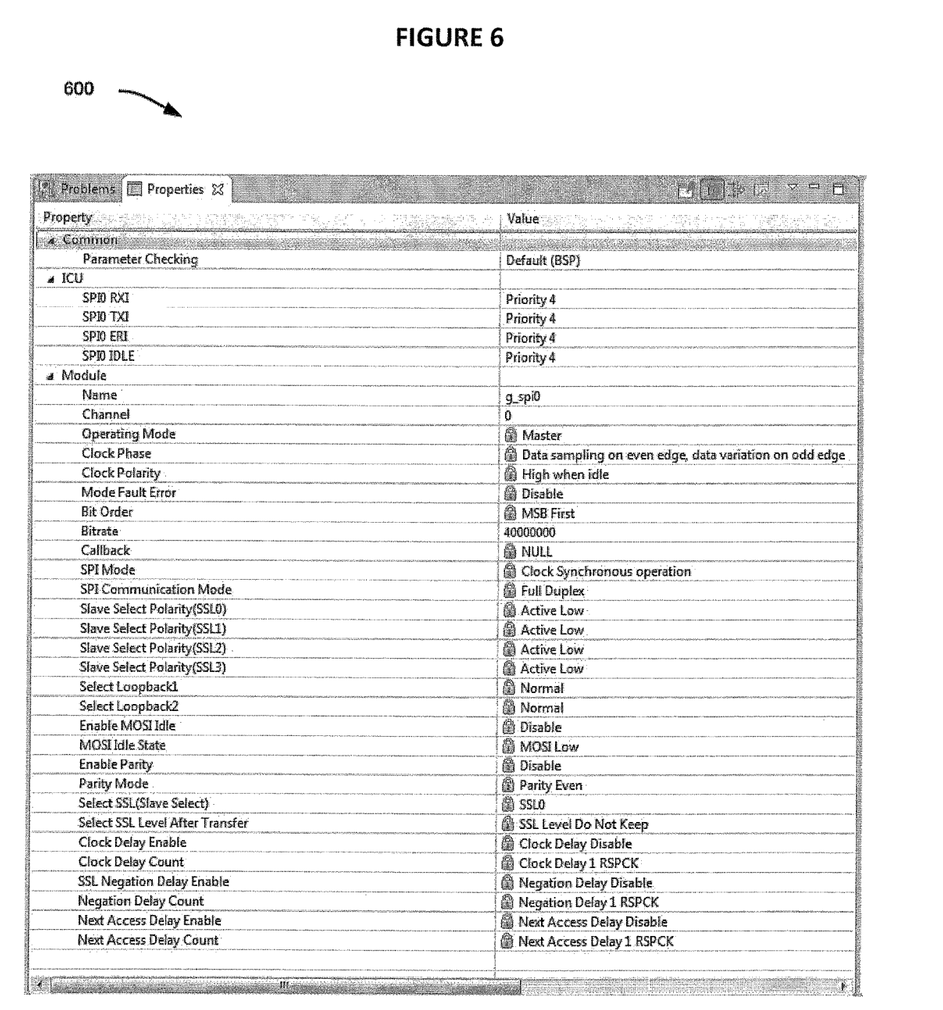
FIG. 6 is a screenshot of an example graphical user interface for setting properties of a software module that is being customized, according to one embodiment.

Example Screenshots for Building and Configuring an Embedded Software Application FIG. 5 is a screenshot of an example graphical user interface for picking a software module to customize, according to one embodiment. FIG. 6 is a screenshot of an example graphical user interface for setting properties of a software module that is being customized, according to one embodiment. These figures are provided to facilitate the discussion herein, and are not intended to be limiting in any way. These Figures will be discussed in more detail in conjunction with the discussion of FIG. 7 below, but a brief introduction is helpful here.

As can be seen, FIG. 5 depicts example graphical user interface 500. As can be seen in FIG. 5, example user interface 500 contains a box labeled "Threads" near the upper left of the screenshot. This box displays two threads: "HAL/Common" and "Blinky Thread," the latter of which controls the blinking of various light(s) on a product controlled by an embedded microcontroller. In the example provided herein, the "Blinky Thread" has been selected for configuration. This selection is shown in the box on the right side of the screen, titled "Blinky Thread Stacks." (In other embodiments, a user can choose to add a software module, such as can be seen in box 520, labelled as "Add DTC Driver for Reception." Although not discussed in specific detail below, the process for configuring a newly-added module would be substantially similar to the process discussed below for re-configuring a preconfigured module.)

As can be seen from visually inspecting the "Blinky Thread Stacks" box, a specific stack of software modules is displayed, similar to those discussed in conjunction with FIGS. 3 and 4, above. In this example, certain of the software modules displayed in this stack are fixed and cannot be configured or modified. However, the box labeled 510 can be modified, and will be used for purposes of the discussion herein. For purposes of this discussion, the reader should assume that a user has selected box 510 (such as, e.g., by double-clicking on the box).

As can also be seen, FIG. 6 depicts another example graphical user interface 600. Graphical user interface 600 depicts an example of a properties tab that can be displayed when a user selects a software module to configure. In conjunction with the discussion of FIG. 5, above, the property configuration box displayed in FIG. 6 can be displayed in response to the user selecting box 510 of FIG. 5, as mentioned above. The connection between the two Figures can be seen, at least, in the fact that module 510 is named "g_spi( )" which can be seen from a visual inspection of FIG. 5 and which is also displayed as the "Name" on the "Module" as shown in FIG. 6. As can also been seen from a visual inspection of FIG. 6, various properties are listed in the left-hand column, and the values of those properties are listed in the right-hand column. As a visual inspection of this Figure reveals, many of these property values are preceded by a "lock" icon, which indicates that the value is locked and cannot be configured or modified. Certain other values, such as the value for the "Bitrate" value, are not preceded by a "lock" icon, and therefore cannot be configured and/or modified. In practice, other mechanisms can be used to indicate that certain values are locked and cannot be changed, such as "graying out" the value or the box containing the value, or by otherwise preventing the user from selecting that value. And of course, other display mechanisms can be used besides, or in addition to, the example screenshots provided for the sake of discussion herein.

In one embodiment, visual interfaces (such as the example screenshots depicted in FIGS. 5 and 6) are based, at least in part, on underlying data presented in XML format. In other embodiments, other code formats or markup languages can be used, such as JSON or JavaScript, as two non-limiting examples. In one embodiment, the visual interfaces are dynamically generated by using, at least in part, the underlying data, such as data presented in XML format. In one embodiment, the XML that controls interactions between software components can be referred to as Module XMLs. Module XMLs allow for many different types of behavior between software components. For example, each software module (such as those depicted in FIG. 5) can be controlled by an associated <module> element in the Module XML. Using Module XMLs components allows for functionality such as specifying dependencies on other Module XMLs, indicating what features are being provided by the current Module XML, showing a user what configuration options are available for a given microcontroller, and generating both compile-time and runtime code. Complex stacks of software components can also be created and automatically connected for the user. The systems, methods, and architecture disclosed herein allows for this complexity to be taken care of by the tooling and Module XMLs while presenting simple representations to the user.

Module XMLs can build on top of one another to provide flexibility and abstract portions that can change depending on the embedded software application that is being developed. For example, depending on the embedded system being developed, different options will be available for addition, modification, configuration, and so forth. Instead of presenting invalid options to the user, Module XMLs have the ability to only show valid options that are available for the customer's project.

Example Method for Building and Configuring an Embedded Software Application

Figure 7:
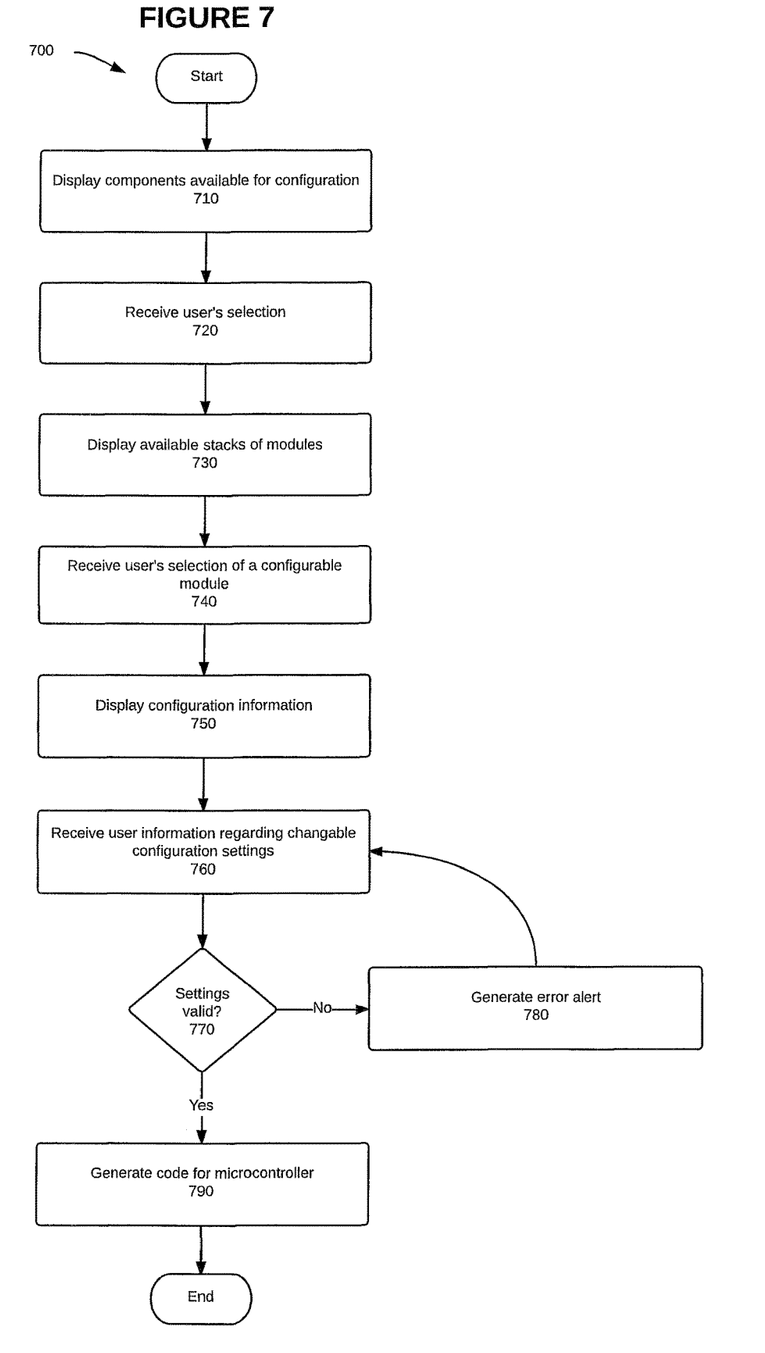
FIG. 7 is a flowchart that illustrates actions that can be performed by the systems and methods described herein, according to one embodiment.

FIG. 7 is a flowchart of method 700 illustrating various actions performed in connection with one embodiment of the systems and methods disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment.

Method 700, which is described with reference to the example elements shown in FIGS. 1-6, shows a procedure that can be performed by a software program in accordance with this disclosure. More specifically, method 700 depicts a method for building and configuring an embedded software application. For ease of discussion and understanding, method 700 will be discussed with specific reference to FIGS. 5 and 6, although, again, FIGS. 1-4 (as well as FIG. 8) also display various components, features, and functionality that can be used in accordance with method 700.

Method 700 begins at step 710, in which a software program displays a set of one or more threads to a user, as can be seen in the "Threads" box of FIG. 5. In one embodiment, all of the displayed threads are available for re-configuration or modification. In another embodiment, only some of the displayed threads are available for re-configuration or modification, in which case the threads that are not available for re-configuration or modification may be "grayed out," "locked," or presented in a manner that otherwise prevents a user from selecting any such unavailable threads. Moreover, in other embodiments, the first level of selection can be based on an organizational structure other than the example of "threads" that is used in the discussion herein. The user can then select a thread (or other organizational structure), such as the "Blinky Thread" of FIG. 5. As will be the case throughout this disclosure, a user can indicate his or her selection via any acceptable input method, such as, e.g., double-clicking a mouse or touchpad, or touching the appropriate part of a touchscreen device. Method 700 receives this selection in 720.

In 730, method 700 then displays a software module (or group of software modules) that are related to the selected thread. In one embodiment, all of the displayed software module(s) are available for re-configuration or modification. In another embodiment, only some of the displayed software module(s) are available for re-configuration or modification, in which case the software modules that are not available for re-configuration or modification may be "grayed out," "locked," or presented in a manner that otherwise prevents a user from selecting any such unavailable software modules. In one embodiment, the group of software modules can take the form of a stack of software modules. In the specific example embodiment depicted in FIG. 5, the group of software modules that are available for configuration can take the form of a "thread stack," or a stack of software modules, as can be seen in the example "Blinky Thread Stacks" box of FIG. 5. The user can then select a specific module to modify or configure, such as the "s_spi( ) SPI Driver on r_rspi" module, labeled as box 510 in FIG. 5. As is the case throughout this disclosure, the user can indicate his or her selection via any acceptable input method, such as, e.g., double-clicking a mouse or touchpad, or touching the appropriate part of a touchscreen device. Method 700 receives this selection in 740.

In 750, method 700 then displays a list of properties related to the selected software module. One example of such a display is depicted in FIG. 6. As can be seen from FIG. 6, certain properties (in the left hand column) have values (in the right hand column) that are "locked." These "locked" properties cannot be modified by the user, as they are required to retain their current value to allow the underlying embedded software application to properly function with, and/or control, the associated microcontroller. In other embodiments, the values that are "locked" and/or otherwise cannot be modified can be depicted in some other manner, such as being "grayed out" or otherwise made unavailable for a user selection. The list of properties, the values associated with each property, and whether or not the values are "locked" are controlled in one embodiment by the underlying XML that is customized for the particular chip at issue. In other embodiments, as mentioned above, other code formats or markup languages can be used (e.g., JSON or JavaScript) can be used. However, the user may select any property that is available for selection for modification, such as the value associated with the "Bitrate" property in FIG. 6. Method 700 receives this selection in 760.

In 770, method 700 determines if the configuration values received in step 760 are valid. In one embodiment, this determination can be made by, at least in part, verifying the configuration values against a list of permissible values, such as can be provided in the underlying XML (or other code format) code. As is discussed elsewhere in this disclosure, embedded software applications often contain multiple software modules that must work together, and which must further be optimized to work with a microcontroller and configured to work within the constraints of the microcontroller. For instance, microcontrollers have a limited and typically fixed amount of memory that cannot be exceeded at runtime (or otherwise). Microcontrollers also have other constraints that must be maintained, such as an acceptable range of bitrates, to make use of the specific property-value pair discussed above in conjunction with FIG. 6. In other embodiments, other property values may be changed, and must be verified with respect to the valid range of values for any given property.

If method 700 determines that the value received in 760 results in one or more invalid settings, per the determination of 770, method 700 then issues an alert in 780. This alert can take the form of a popup message, alert box, dialogue box, text box, audible noise or message, or any other appropriate form of alert than can be provided to a user. In one embodiment, the alert can include a message indicating the specific problem, and/or providing guidance on how to correct the problem. At this point, in embodiment depicted in FIG. 7, method 700 looks back to 760 and awaits further input from the user. In other embodiments, method 700 can end following 780.

If method 700 determines that the value received in 760 results in all of the settings being valid, per the determination of 770, then method 700 proceeds to 790. In 790, method 700 generates compile-time and/or runtime code. In one embodiment, runtime code can be used to perform tasks such as software initialization. In one embodiment, the generated code is also compiled. Compiling the modified stack of software modules produces compiled computer instructions that are optimized for use with a microcontroller. As such, these compiled computer instructions can be optimized in light of the various constraints and considerations discussed above, especially with respect to the limited memory that is typically available on a microcontroller chip. In other embodiments, the generated code can be further modified prior to compiling the code, wherein the further modifications can be performed in accordance with systems, methods, and architectures that are beyond the scope of this disclosure. Although not expressly depicted in FIG. 7, the compiled code can then be "flashed" or otherwise uploaded to microcontroller 100, and stored in a memory such as memory 120. Method 700 then concludes.

Example Computer System

As shown above, the systems described herein can be implemented using a variety of computer systems. Examples of one such computing environment is described below with reference to FIG. 8.

Figure 8:
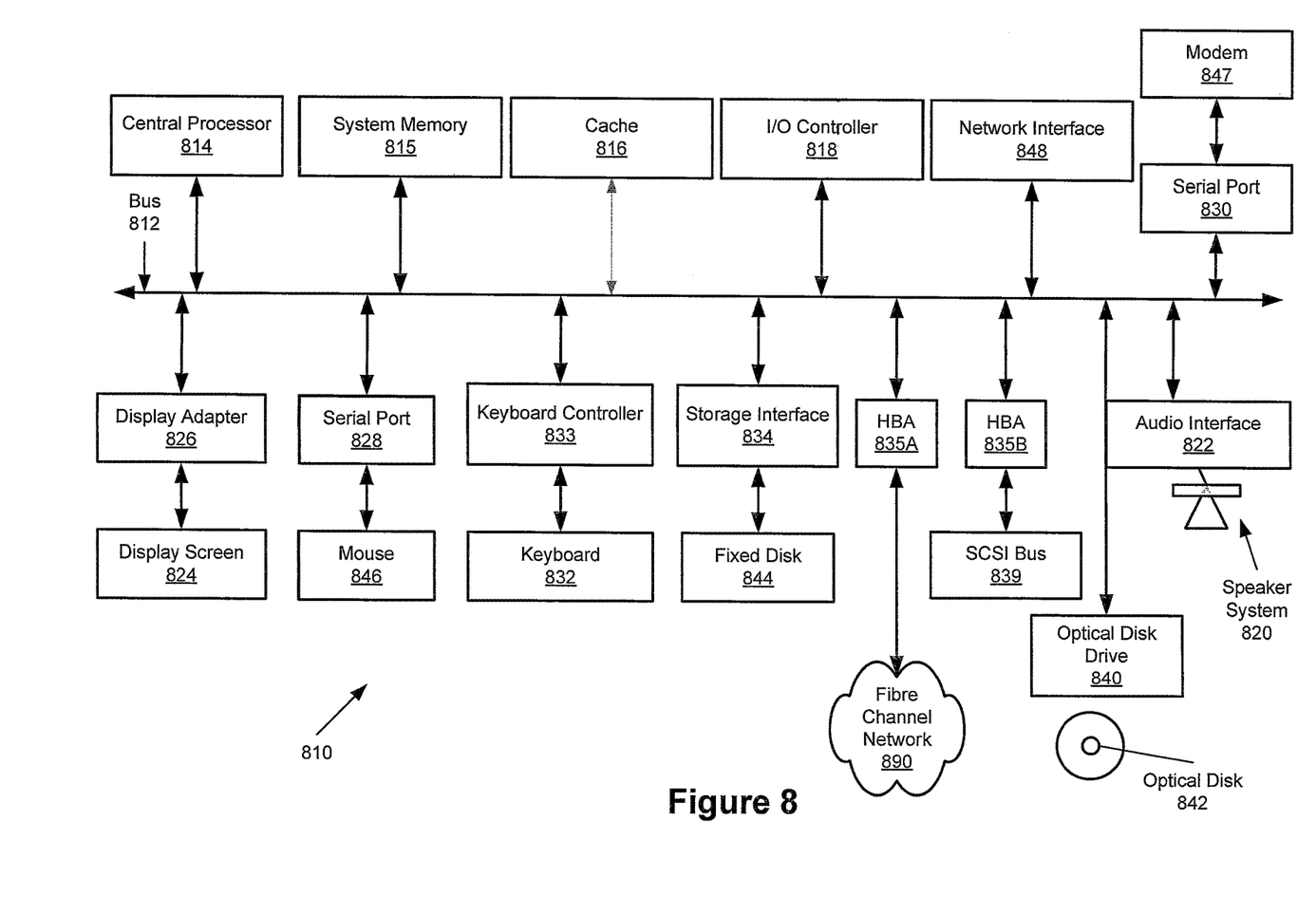
FIG. 8 is a block diagram of a computing device, illustrating how certain features of the invention disclosed herein can be implemented in software, according to one embodiment.

FIG. 8 depicts a block diagram of a computer system 810 suitable for implementing aspects of the systems described herein. Computer system 810 includes a bus 812 which interconnects major subsystems of computer system 810, such as a central processor 814, a system memory 815 (typically RAM, but which may also include ROM, flash RAM, or the like), a cache 816, an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications and/or software, such as those discussed herein, resident with computer system 810 are generally stored on and accessed from a computer-readable storage medium, such as a hard disk drive (e.g., fixed disk 844), an optical drive (e.g., optical drive 840), or other computer-readable storage medium.

Storage interface 834, as with the other storage interfaces of computer system 810, can connect to a standard computer-readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the systems described herein. The devices and subsystems can be interconnected in different ways from that shown in FIG. 8. The operation of a computer system such as that shown in FIG. 8 is readily known in the art and is not discussed in detail in this application. Code to implement the modules of the systems described herein can be stored in computer-readable storage media such as one or more of system memory 817, fixed disk 844, or optical disk 842. The operating system provided on computer system 810 may be MS-DOS®, MS-WINDOWS®, UNIX®, Linux®, AIX®, or another operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:

displaying a set of microcontroller properties that are available for configuration with respect to a microcontroller, wherein the microcontroller comprises an embedded software application, the embedded software application comprises compiled computer instructions, and each microcontroller property has a corresponding value associated with the property;

receiving user information regarding a first value corresponding to a first microcontroller property, wherein the first microcontroller property is associated with the embedded software application;

determining whether the user information results in a valid microcontroller configuration, wherein determining includes at least verifying interoperability between two or more modules of the embedded software application based on the user information;

in response to determining that the user information results in a valid microcontroller configuration, generating compiled code for the microcontroller, wherein the compiled code replaces the embedded software application; and wherein the set of microcontroller properties that is displayed comprises at least one property with a corresponding value that is locked, and at least one property with a corresponding value that is available for configuration.

2. The method of claim 1, wherein the microcontroller properties and the corresponding values are based on extensible markup language (XML) code.

3. The method of claim 1, further comprising prior to displaying the set of microcontroller properties that are available for configuration, displaying a set of threads that are available for configuration;

receiving information regarding a selected thread from a user; and displaying a stack of software modules related to the selected thread.

4. The method of claim 3, further comprising receiving information regarding a selected software module from a user, wherein the selected software module corresponds to the selected thread.

5. The method of claim 4, wherein the displaying the set of microcontroller properties that are available for configuration is performed in response to the receiving the information regarding the selected software module.

6. The method of claim 1, wherein the compiled code comprises at least one command from a predefined software library file, without including the entire predefined software library file.

7. A system comprising:

a microprocessor;

a computer screen;

a non-transient computer-readable memory, comprising computer instructions executable by the microprocessor, wherein the instructions are configured to perform a method comprising the steps of:

displaying a set of microcontroller properties that are available for configuration with respect to a microcontroller, wherein the microcontroller comprises an embedded software application, the embedded software application comprises compiled computer instructions, and each microcontroller property has a corresponding value associated with the property;

receiving user information regarding a first value corresponding to a first microcontroller property, wherein the first microcontroller property is associated with the embedded software application;

determining whether the user information results in a valid microcontroller configuration, wherein determining includes at least verifying interoperability between two or more modules of the embedded software application based on the user information;

in response to determining that the user information results in a valid microcontroller configuration, generating compiled code for the microcontroller, wherein the compiled code replaces the embedded software application; and wherein the set of microcontroller properties that is displayed comprises at least one property with a corresponding value that is locked, and at least one property with a corresponding value that is available for configuration.

8. The system of claim 7, wherein
the microcontroller properties and the corresponding values are based on extensible markup language (XML) code.

9. The system of claim 7, wherein the steps of the method further comprise:

prior to displaying the set of microcontroller properties that are available for configuration, displaying a set of threads that are available for configuration;

receiving information regarding a selected thread from a user; and displaying a stack of software modules related to the selected thread.

10. The system of claim 9, wherein the steps of the method further comprise:

receiving information regarding a selected software module from a user, wherein the selected software module corresponds to the selected thread.

11. The system of claim 10, wherein
the displaying the set of microcontroller properties that are available for configuration is performed in response to the receiving the information regarding the selected software module.

12. The method of claim 7, wherein
the compiled code comprises at least one command from a predefined software library file, without including the entire predefined software library file.

13. A computer program product, comprising a plurality of program instructions stored on a non-transient computer readable storage medium, wherein the instructions are configured to execute a method comprising the steps of:

displaying a set of microcontroller properties that are available for configuration with respect to a microcontroller, wherein
the microcontroller comprises an embedded software application,
the embedded software application comprises compiled computer instructions, and
each microcontroller property has a corresponding value associated with the property;

receiving user information regarding a first value corresponding to a first microcontroller property, wherein the first microcontroller property is associated with the embedded software application;

determining whether the user information results in a valid microcontroller configuration, wherein determining includes at least verifying interoperability between two or more modules of the embedded software application based on the user information;

in response to determining that the user information results in a valid microcontroller configuration, generating compiled code for the microcontroller, wherein the compiled code replaces the embedded software application; and wherein the set of microcontroller properties that is displayed comprises at least one property with a corresponding value that is locked, and at least one property with a corresponding value that is available for configuration.

14. The computer program product of claim 13, wherein the steps of the method further comprise:

prior to displaying the set of microcontroller properties that are available for configuration, displaying a set of threads that are available for configuration;

receiving information regarding a selected thread from a user; and displaying a stack of software modules related to the selected thread.

15. The computer program product of claim 14, wherein the steps of the method further comprise:

receiving information regarding a selected software module from a user, wherein the selected software module corresponds to the selected thread.

16. The computer program product of claim 15, wherein
the displaying the set of microcontroller properties that are available for configuration is performed in response to the receiving the information regarding the selected software module.

17. The method of claim 1, wherein determining further includes verifying that the two or more modules of the embedded software application are configured to work within constraints of the microcontroller.

* * * * *